US009537734B2

(12) United States Patent
Paek et al.

(10) Patent No.: US 9,537,734 B2
(45) Date of Patent: Jan. 3, 2017

(54) NETWORK-BASED HIGH PERFORMANCE SAP MONITORING SYSTEM AND METHOD

(71) Applicant: Somansa Co., Ltd., Seoul (KR)

(72) Inventors: Seung Tae Paek, Seoul (KR); Hwan Cheol Lim, Seoul (KR); Tae Wan Kim, Seoul (KR); Sang Man Lee, Daejeon (KR)

(73) Assignee: SOMANSA CO., LTD., Seoul (KR)

( * ) Notice: Subject to any disclaimer, the term of this patent is extended or adjusted under 35 U.S.C. 154(b) by 413 days.

(21) Appl. No.: 14/249,961

(22) Filed: Apr. 10, 2014

(65) Prior Publication Data

US 2015/0127817 A1 May 7, 2015

(30) Foreign Application Priority Data

Nov. 6, 2013 (KR) ........................ 10-2013-0134035

(51) Int. Cl.
*H04L 12/26* (2006.01)
*H04L 29/06* (2006.01)

(52) U.S. Cl.
CPC ............. *H04L 43/028* (2013.01); *H04L 29/06* (2013.01)

(58) Field of Classification Search
CPC ....................................................... H04L 29/06
See application file for complete search history.

(56) References Cited

U.S. PATENT DOCUMENTS 6,085,328 A * 7/2000 Klein ..................... G06F 1/3209
709/227

7,389,462 B1 * 6/2008 Wang ...................... H04L 1/188
714/748

(Continued)

FOREIGN PATENT DOCUMENTS

KR  10-1200906  11/2012 ............. G06F 21/20
KR  10-1294280  8/2013 ............. G06F 21/30

OTHER PUBLICATIONS

Notice of Allowance, dated Nov. 14, 2014, issued in Korean Patent Application No. 10-2013-0134035.

*Primary Examiner* — Lashonda Jacobs
(74) *Attorney, Agent, or Firm* — Harness, Dickey & Pierce, P.L.C.

(57) ABSTRACT

Provided are a network-based high performance SAP monitoring system and method, including a hardware engine selecting packets to be updated from input packets by performing session-based filtering and pattern matching on the input packets, identifying to which application protocol belongs among dynamic information and action gateway (DIAG) protocol, remote function call (RFC) protocol, and hypertext transfer protocol (HTTP) protocol, and adding identification information of the identified application protocol to the packet to be uploaded and a software engine including a DIAG processor processing the DIAG protocol, RFC processor processing the RFC protocol, and HTTP processor processing the HTTP protocol, when receiving the packet added with the identification information from the hardware engine, referring SAP application protocol identification information, extracting data transmitted and received between servers of an SAP client and one of the DIAG processor, RFC processor, and HTTP processor, thereby sorting and processing the three types of SAP application protocol such as the DIAG protocol, RFC protocol, and HTTP protocol.

6 Claims, 6 Drawing Sheets

(56) References Cited

U.S. PATENT DOCUMENTS

| | | | |
|---|---|---|---|
| 7,917,651 B2* | 3/2011 | Khan | G06F 9/466 709/201 |
| 2007/0288934 A1* | 12/2007 | Khan | G06F 9/466 719/318 |
| 2015/0113442 A1* | 4/2015 | Aghadavoodi Jolfaei | G06F 3/0484 715/753 |

* cited by examiner

NETWORK-BASED HIGH PERFORMANCE SAP MONITORING SYSTEM AND METHOD

RELATED APPLICATIONS

This application claims the benefit and priority to Korean Patent Application No. 10-2013-0134035, filed on Nov. 6, 2013. The entire disclosure of the application identified in this paragraph is incorporated herein by reference.

BACKGROUND

One or more embodiments of the present invention relate to a network-based SAP monitoring system, and more particularly, to an SAP monitoring system and method, in which identification for all three types of SAP application protocols is processed in a single system.

SAP, which is Enterprise resource planning (ERP) solution most widely used in the world, has a client-server structure. Through continuous updates up to now, SAP supports application protocols for three types of client-server communication. Application protocol used for communication between an SAP graphical user interface (GUI), which is a most basic SAP client application program, and a server supports hypertext transfer protocol (HTTP)-based data communication through a TCP/IP-based dynamic information and action gateway (DIAG) protocol developed while being optimized for a data transaction structure with a unit SAP GUI screen, a web-based SAP GUI service, and an SAP GUI for JAVA/HTML module considering extensibility of application development. In this case, a data payload structure transmitted and received is identical to a data payload structure of a DIAG application protocol. In addition, data communication through remote function call (RFC) application protocol is also supported. A data payload structure used in the RFC application protocol differs from that of the DIAG application protocol. FIGS. 1 and 2 are configuration views illustrating a payload of a DIAG data packet and a payload of an RFC data packet analyzed and reconfigured by reverse engineering, respectively.

As described above, SAP (herein, SAP is the name of a solution, made of initials of system, application, and products in the data processing and the number of a vendor manufacturing the solution) supports data communication through HTTP and RFC in addition to DIAG application protocols, which is necessary to be network-based monitored. In addition, due to the nature of SAP, applications with respect to managerial resources of an enterprise, that is, inventory control, purchasing control, production management, sales management, personnel management, financial management, managerial accountings, etc. are combined with one another in an integrated database in real time. In a regard of accessing sensitive information necessary for being restricted in enterprises, it is very necessary to regularly monitor inquiries and accesses unauthorized internal sources and information. Traffics occurring on network caused by a large amount of data transactions occurring while using managerial resources in various fields, in case of enterprises or companies employing several hundreds or thousands of staffs, reach a degree of from several tens to several hundreds Mbps or several Gbps.

CITED REFERENCE

Cited Reference 1: KR10-1294280 B1

SUMMARY

One or more embodiments of the present invention provide an SAP monitoring system and method, having a structure for processing identification of three types of SAP application protocols all in a single system.

Embodiments of the present invention provide network-based high performance SAP monitoring systems including a hardware engine selecting a packet to be uploaded from input packets by performing session-based filtering and pattern matching on the input packets, identifying to which application protocol belongs among dynamic information and action gateway (DIAG) protocol, remote function call (RFC) protocol, and hypertext transfer protocol (HTTP) protocol, and adding identification information of the identified application protocol to the packet to be uploaded and a software engine including a DIAG processor processing the DIAG protocol, an RFC processor processing the RFC protocol, and an HTTP processor processing the HTTP protocol, when receiving the packet added with the identification information from the hardware engine, referring SAP application protocol identification information, extracting data transmitted and received between servers of an SAP client and one of the DIAG processor, RFC processor, and HTTP processor, thereby sorting and processing the three types of SAP application protocol such as the DIAG protocol, RFC protocol, and HTTP protocol.

In some embodiments, the system may further include a management unit providing a user interface for SAP monitoring, updating firmware and signature of the hardware engine, managing instances of the software engine, and setting up options for SAP application protocol processing for each instance.

In other embodiments, the system may further include a channel management unit of a kernel level, generating and managing a channel for transmitting and receiving a policy, signature, command, and data among the management unit, software engine, and hardware engine and a direct memory access (DMA) channel for transmitting an SAP application data packet from the hardware engine to the instance of the software engine.

In still other embodiments, the software engine may have a multi-instance structure including a plurality of instances including the DIAG processor, RFC processor, and HTTP processor, respectively, and may be configured to process the three types of application protocol using one or more of the plurality of instances through setting up of the management unit.

In even other embodiments, the management unit may distributed-process the SAP application protocol by controlling each of the plurality of instances to selectively process the SAP application protocol.

In yet other embodiments, the hardware engine may include a multi-core processor (MCP) logic unit. The MCP logic unit may include a session matching portion, a packet filtering portion, and an SAP application protocol identification portion. The session matching portion may generate a hash value by extracting 4-tuple information of the input packet, may compare the generated hash value with a hash value list of a valid SAP application protocol session previously identified, when being matched, may transmit a session hash value matched with the corresponding packet to the SAP application protocol identification portion, and when being not matched, may transmit the corresponding packet to the packet filtering portion. The packet filtering portion, in accordance with 5-tuple-based packet filtering regulations, may determine whether the packet received from the session matching portion is a target of filtering, may filter out a packet that is the target of filtering, and may transmit a packet that is not the target of filtering to the SAP application protocol identification portion. The SAP application protocol identification portion, when the packet received from the packet filtering portion is matched with at least one of the three types of SAP application protocol through pattern matching based on a signature for identifying SAP application protocol packets, may store a session hash value and identified protocol information of the corresponding packet, may add identified protocol information to the corresponding packet, and may transmit the packet added with the identified protocol information to the software engine, in which the packet received through the session matching portion may be added with identified protocol information referring to the hash value transmitted together and transmitted to the software engine.

In further embodiments, the system may further include a peripheral component interconnect express (PCI-e) matching portion transmitting the packet added with the SAP application protocol identification information, received from the SAP application protocol identification portion, to the software engine through a PCI-e bus.

In other embodiments of the present invention, network-based high performance SAP monitoring methods performed by hardware engines and software engines selectively processing for each SAP application protocol, the methods include selecting a packet to be uploaded by performing session-based and policy-based packet filtering on an input packet using the hardware engine, identifying to which one of DIAG protocol, RFC protocol, and HTTP protocol of SAP application protocol the selected packet to be uploaded belongs, using the hardware engine, adding identification information on the identified application protocol using the hardware engine, the hardware engine, transmitting the packet to be uploaded and the identification information to the software engine using a DMA channel, and the software engine including a DIAG processor processing the DIAG protocol, an RFC processor processing the RFC protocol, and an HTTP processor processing the HTTP protocol, referring SAP application protocol identification information, extracting data transmitted and received between servers of an SAP client and one of the DIAG processor, the RFC processor, and the HTTP processor.

In some embodiments, the software engine may have a multi-instance structure including a plurality of instances including the DIAG processor, RFC processor, and HTTP processor, respectively, and may be configured to process the three types of application protocol using one or more of the plurality of instances through setting up of the management unit.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION

Figure 1:
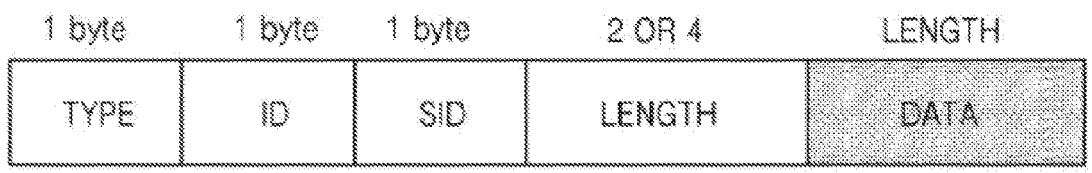
FIG. 1 is a configuration diagram illustrating a data payload of dynamic information and action gateway (DIAG) protocol among SAP application protocols.
Figure 2:
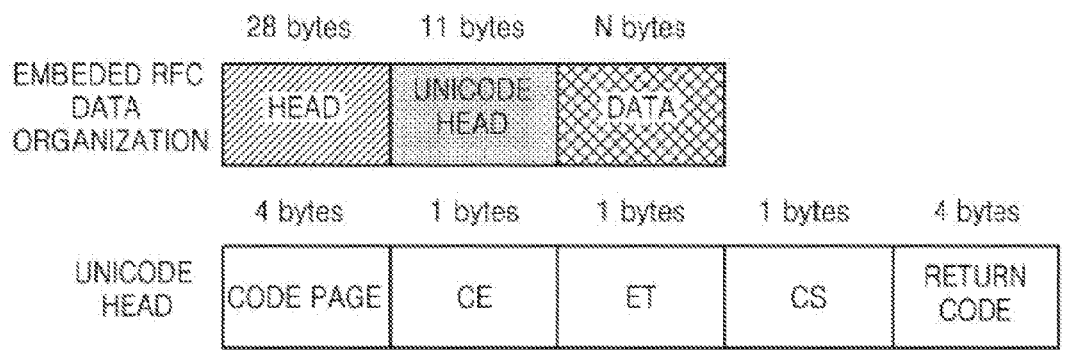
FIG. 2 is a configuration diagram illustrating a data payload of remote function call (RFC) protocol among SAP application protocols.

Hereinafter, exemplary embodiments of the present invention will be described in detail with reference to the attached drawings.

The embodiments of the present invention are provided to more perfectly explain the inventive concept to a person with ordinary skill in the art. The following embodiments may be modified into various other forms but the scope of the inventive concept is not limited thereto. The embodiments are provided to allow the present disclosure to be more substantial and full and to perfectly transfer the inventive concept to those skilled in the art.

Terms used herein are to describe particular embodiments and do not limit the inventive concept. As used herein, the singular forms "a," "an" and "the" are intended to include the plural forms as well, unless the context clearly indicates otherwise. It will be further understood that the terms "comprises" and/or "comprising" used herein specify the presence of stated shapes, numbers, operations, elements, and/or a group thereof, but do not preclude the presence or addition of one or more other shapes, numbers, operations, elements, and/or groups thereof. As used herein, the term "and/or" includes any and all combinations of one or more of the associated listed items.

It will be understood that although the terms "first", "second", etc. may be used herein to describe various components, these components should not be limited by these terms. The terms do not mean a particular order, top and bottom, or merits and demerits but are only used to distinguish one component from another. Accordingly, a first element, area, or portion that will be described below may indicate a second element, area, or portion without deviating from teachings of the inventive concept.

Hereinafter, the embodiments of the inventive concept will be described with reference to schematic drawings. In the drawings, for example, according to manufacturing technologies and/or tolerances, illustrated shapes may be modified. Accordingly, the embodiments of the present invention will not be understood to be being limited to certain shapes of illustrated areas but will include variances in shapes caused while being manufactured.

Figure 3:
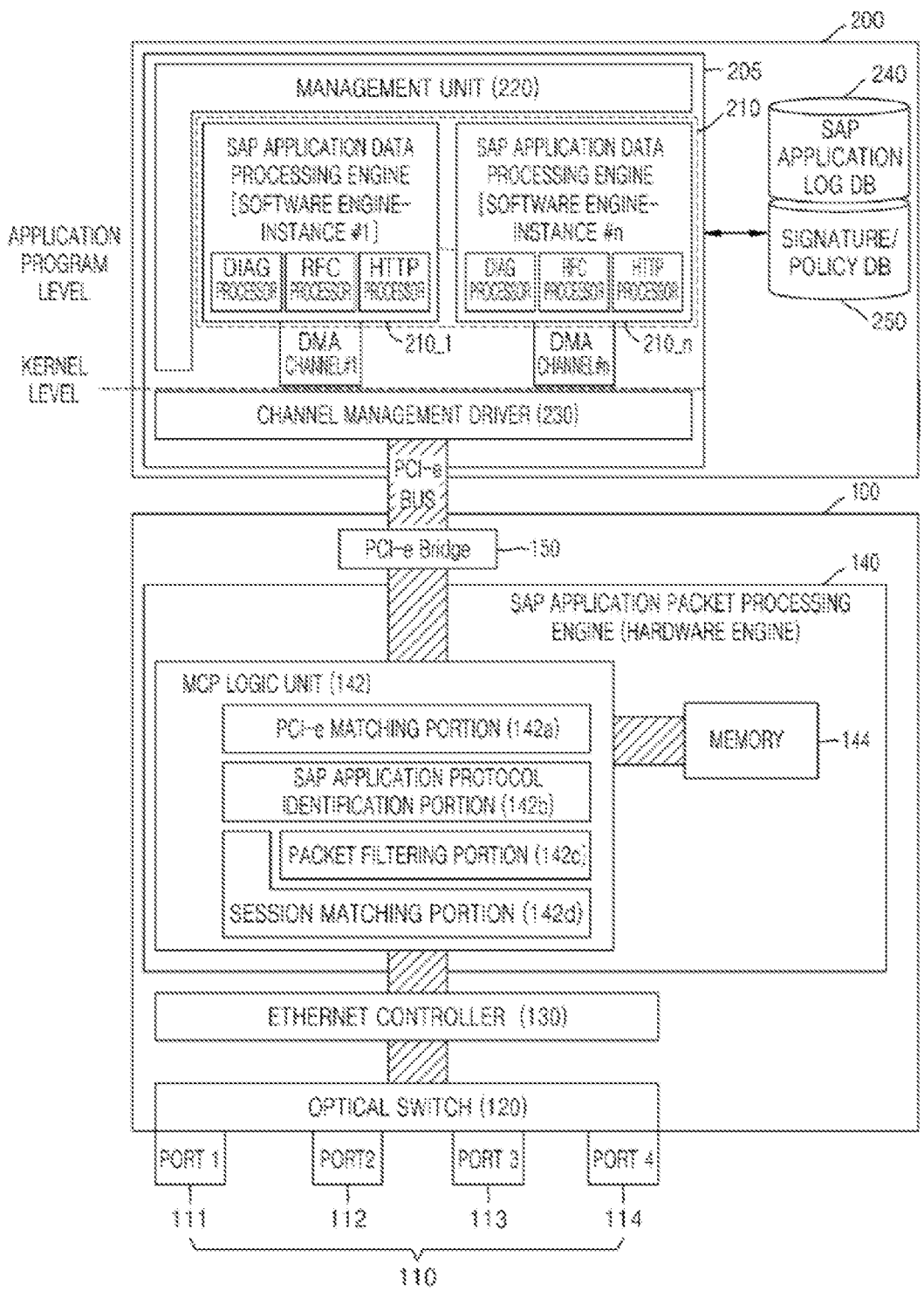
FIG. 3 is a schematic configuration diagram illustrating a network-based high performance SAP monitoring system according to an embodiment of the present invention.

FIG. 3 is a schematic configuration diagram illustrating a network-based high performance SAP monitoring system according to an embodiment of the present invention.

Referring to FIG. 3, the system includes a packet processing board 100 and a host board 200.

The packet processing board 100 includes a port 110, an optical switch 120, an Ethernet controller 130, a hardware engine 140 that is an SAP application packet processing engine, and a peripheral component interconnect express (PCI-e) bridge 150.

The port 100 may include four ports such as a port 1 111, a port 2 112, a port 3 113, and a port 4 114. The port 100, as an optical port connected in a mirroring mode by port mirroring an external TAP or a backbone switch device, receives and transmits Internet packets of bidirectional in/out traffics to the Ethernet controller 130. The port 100, for example, may be a gigabit NIC port formed on a PCI-e type board.

The optical switch 120 transmits packets inputted from a plurality of ports 110 to the Ethernet controller 130.

The Ethernet controller 130 converts Internet traffics of a physical layer received from at least one of the four ports 110 into packets of a data link layer and transfer the packets to the hardware engine 140.

The hardware engine 140 that is the SAP application packet processing engine includes a multi-core processor (MCP) logic unit 142 and a memory 144. The hardware engine 140 selects a packet to be uploaded from input packets by performing session-based filtering and pattern matching on the input packets, identifies where application protocol belongs to among dynamic information and action gateway (DIAG) protocol, remote function call (RFC) protocol, and hypertext transfer protocol (HTTP) protocol, and adds identification information with respect to the identified application protocol. Hereinafter, a detailed configuration and function of the MCP logic unit 142 will be described.

The MCP logic unit 142 includes a session matching portion 142d for determining whether a packet corresponds to a previously identified SAP application protocol session, a packet filtering portion 142c for determining whether a packet is a target of filtering set by a management unit 220 that will be described later, an SAP application protocol identification portion 142b identifying three types of SAP application protocol based on signature, adding identification information to an original packet, and transferring to a PCI-e matching portion 142a, the PCI-e matching portion 142a for transferring the packet added with the identification information to a software engine 210 on the host board 200 through a PCI-e bridge 150.

In detail, the session matching portion 142d generates a hash value by extracting four-tuple information such as a source IP, destination IP, source port, and destination port, compares the generated hash value with a hash value list of a previously identified valid SAP application protocol session, when being matched, transmits a session hash value matched with a corresponding packet to the SAP application protocol identification portion 142b, and when being not matched, transmits the corresponding packet to the packet filtering portion 142c.

The packet filtering portion 142c, based on a packet filtering regulation based on 5-tuple such as a source IP, destination IP, source port, destination port, and protocol, determines a packet received from the session matching portion 142d is the target of filtering, filters packets to detect the packet that is the target of filtering, and transmits a packet that is not the target of filtering to the SAP application protocol identification portion 142b.

The SAP application protocol identification portion 142b, when the packet received from the packet filtering portion 142c using pattern matching based on a signature for identifying the three types of SAP application protocol packet analyzed and extracted using a reverse engineering method is matched with at least one of the three types of SAP application protocol, stores a session hash value and identified protocol information, that is, DIAG, RFC, or HTTP of a corresponding packet together in the memory 144, transmits the corresponding packet added with the identified protocol information to the software engine 210, and drops an unidentified packet that is identified not to be a packet of the SAP application protocol.

Also, the SAP application protocol identification portion 142b, in case of the packet received through the session matching portion 142d, referring to the hash value transmitted together, reads out previously identified protocol information stored in the memory 144 to be added to a corresponding packet and transmits the packet to the PCI-e matching portion 142a. That is, in case of a packet belonging to a previously identified session, a signature-based pattern matching treatment is not performed and only previously identified information is used, thereby reducing a time consumed and resources used for the signature-based pattern matching for identifying the SAP application protocol.

To transmit the packet added with the SAP application protocol identification information received from the SAP application protocol identification portion 142b to the software engine 210 on the host board 200 through the PCI-e bridge 150, the PCI-e matching portion 142a transmits the corresponding packet to a channel management unit, that is a channel management driver 230, on the host board 200 through electric signal-based data communication with the PCI-e bridge 150 according to PCI-e standards.

On the other hand, the host board 200, as shown in FIG. 3, includes an SAP monitoring module 205, an SAP application log database (DB) 240, and a signature/policy DB 250. The SAP monitoring module 250 includes the management unit 220, the software engine 210, and the channel management unit, that is, the channel management driver 230.

The SAP monitoring module 205 extracts and stores data according to a kind of SAP application protocol identified based on a packet and identification information received from the hardware engine 140 through a PCI-e bus, which will be described below.

The management unit 220 provides a user interface for a manager of the SAP monitoring system to allow the user to embody and apply an SAP application data monitoring policy, to update firmware and signature of the hardware engine 140, and to perform operations of managing instances of the software engine 210 and setting up an SAP application protocol processing option for each instance. Also, it is allowed to refer to and report data stored in the SAP application log DB 240 and signature/policy DB 250.

The channel management unit 230 is a kernel level driver module generating and managing direct memory access (DMA) channels for transmitting policies, signatures, and commands such as a firmware update execution request command, among the management unit 220, software engine 210, and hardware engine 140 and transmits SAP application data packets from a data transmission/reception channel and the hardware engine 140 to the respective instances of the software engine 210.

Through a structure, in which a packet is directly transferred to the software engine 210 from the hardware engine 140 through the PCI-3 bridge 150 instead of a network I/O module provided by a host operation system through a DMA channel generated by the channel management unit 230, a CPU resource used by the host board 200 is minimized simultaneously with correcting a loss rate of the packet transferred from the hardware engine 140 to the software engine 210 to be close to zero and correcting conditions for allowing the software engine 210 to stably use the CPU resource of the host board 200, thereby maximizing usability of the software engine 210.

The software engine 210, that is, the SAP application data processing engine unit extracts SAP application data from the SAP application data packets transferred from the hardware engine 140 through the DMA channel through the respective data processors for each protocol such as a DIAG processor, RFC processor, and HTTP processor according to three SAP application protocols and stores the SAP application data in a log DB.

As shown in FIG. 3, the software engine 210 may operate as a multi-instance structure, that is, may have n number of multi-instances 210_1 to 210_n. Also, the software engine 210, basically, operates as one instance, but a manager may allow a plurality of instances to be executed through setting up using the management unit 220.

Figure 4:
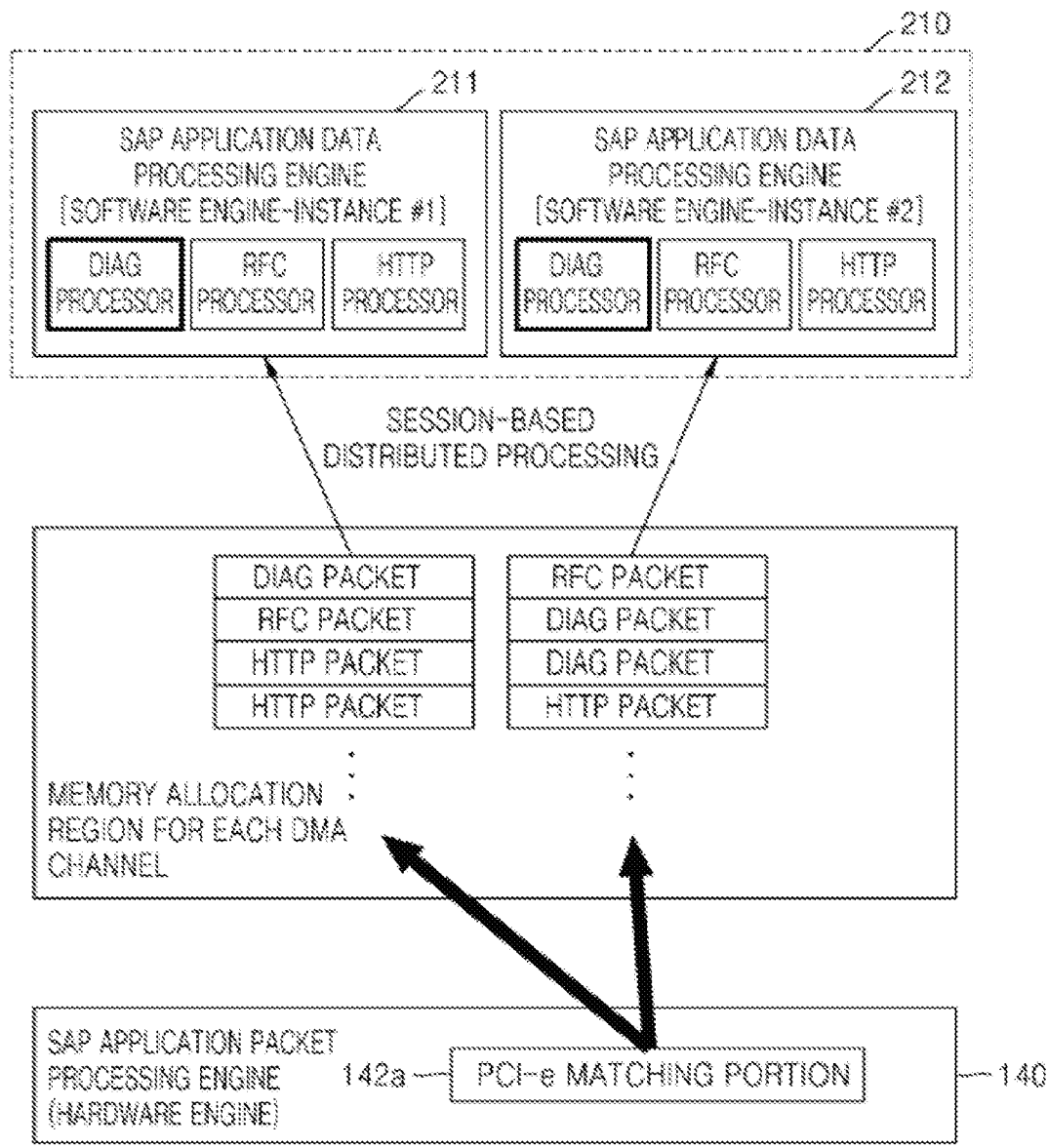
FIG. 4 is a concept diagram illustrating a method, in which a software engine performs a session-based distributed processing using two instances.
Figure 5:
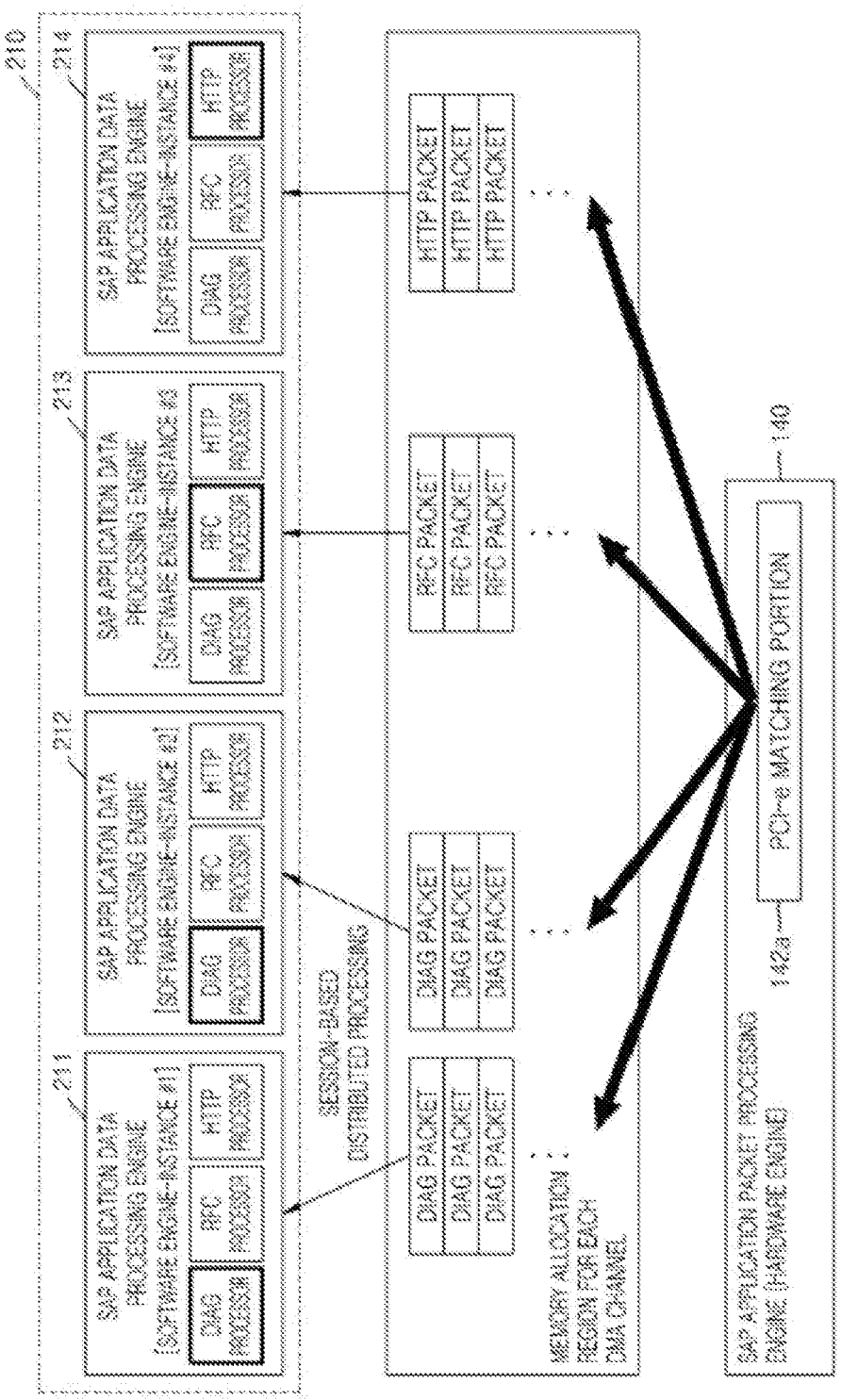
FIG. 5 is a concept diagram illustrating a method, in which the software engine performs a session-based distributed processing using four instances.

Particularly, when being formed of multi-instances, the software engine 210 may selectively set up SAP application protocol to operate, examples of which setting ups and operation are shown in FIGS. 4 and 5.

FIG. 4 is a concept view illustrating a method, in which the software engine 210 performs a session-based distributed processing using two instances.

In FIG. 4, the software engine 210 includes an instance #1 211 and instance #2 212, each of which includes a DIAG processor, RFC processor, and HTTP processor to process all three types of SAP application protocol and may operate to distribute and process a packet transferred from the PCI-e matching portion 142a of the hardware engine 140 based on a session.

FIG. 5 is a concept view illustrating a method, in which the software engine 210 performs a session-based distributed processing using four instances.

In FIG. 5, different from FIG. 4, the software engine 210 includes the instance #1 211, instance #2 212, instance #3 213, and instance #4 214 and distributes and processes a packet transferred from the hardware engine 140 according to a kind of application protocol.

That is, there is illustrated an example of operating as a structure, in which DIAG protocol is processed exclusively by the instance #1 211 and instance #2 212, RFC protocol is processed exclusively by the instance #3 213, and HTTP protocol 214 is processed exclusively by the instance #4 214. However, FIG. 5 merely illustrates one example and it is obvious to provide various modifications based thereon.

Figure 6:
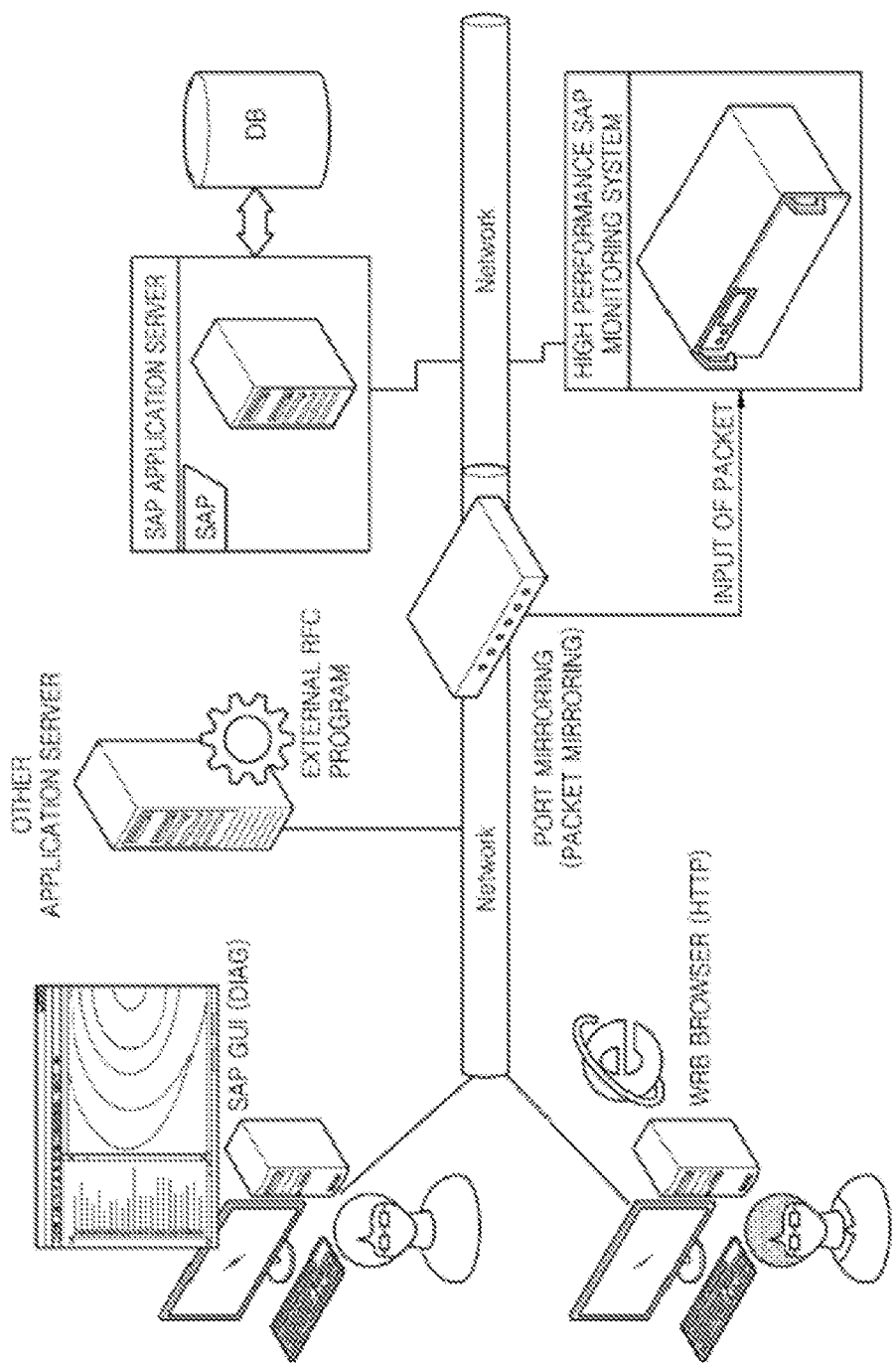
FIG. 6 is a concept diagram illustrating a configuration, in which the network-based high performance SAP monitoring system collects packets transmitted and received between a client and a sever by port mirroring.

FIG. 6 is a concept diagram illustrating a configuration, in which the network-based high performance SAP monitoring system collects packets transmitted and received between a client and a sever by port mirroring.

As shown in FIG. 6, the network-based high performance SAP monitoring system may collect packets transmitted and received between servers of the client and a server by port-mirroring or packet-mirroring using switch, TAP, etc. on a network, in which communication between an SAP application server and SAP client is performed.

Hereinafter, referring to FIG. 7, an operation and concept, in which the network-based high performance SAP monitoring system processes packets, will be described.

Figure 7:
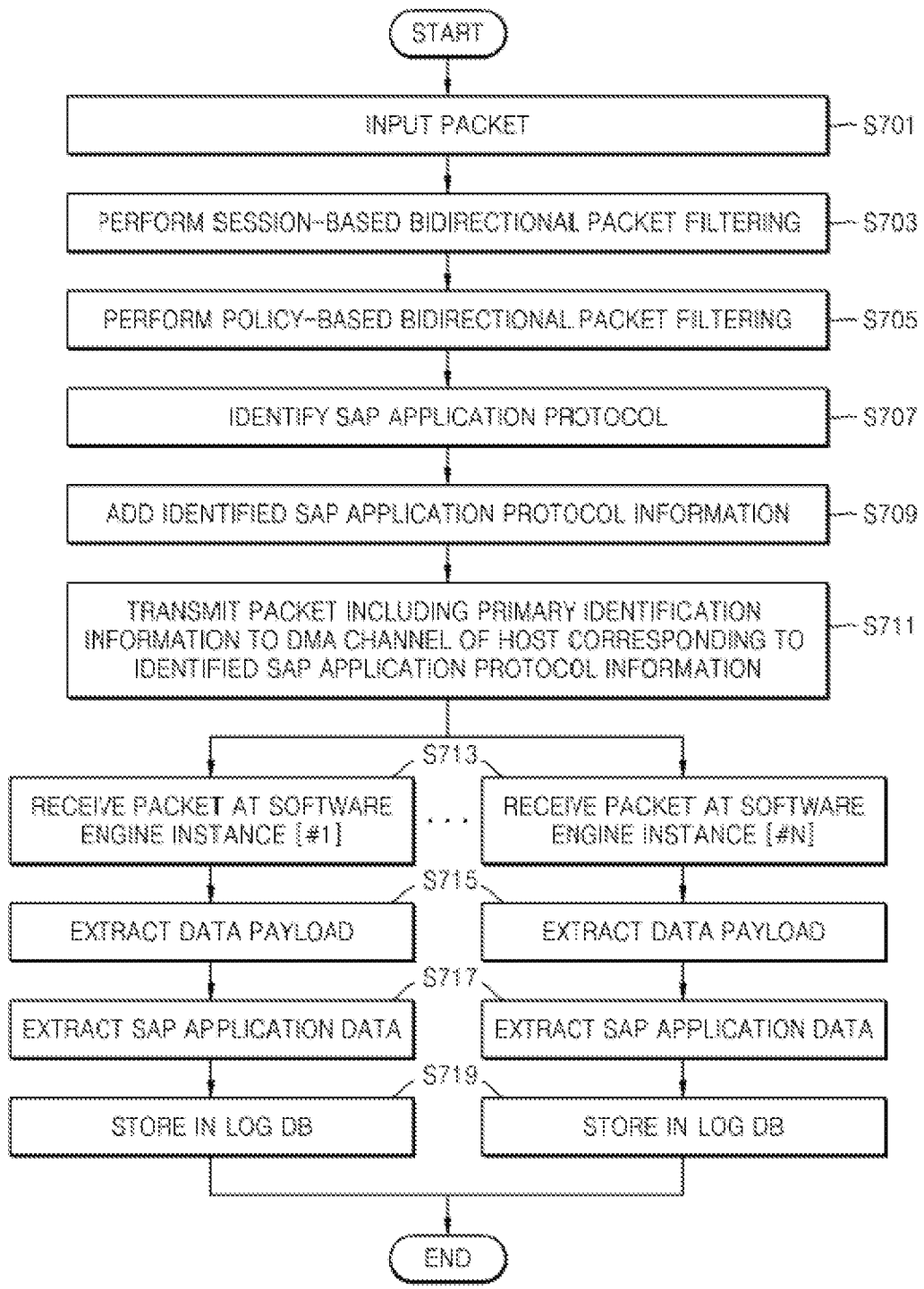
FIG. 7 is a schematic flowchart illustrating a network-based high performance SAP monitoring method according to an embodiment of the present invention.

FIG. 7 is a schematic flowchart illustrating a network-based high performance SAP monitoring method according to an embodiment of the present invention.

A packet is inputted into the port 110 of the hardware engine 140 (S701). The hardware engine 140 performs a session-based bidirectional packet filtering (S703) and performs a policy-based bidirectional packet filtering (S705). A description of the session-based bidirectional packet filtering and policy-based bidirectional packet filtering refers to the description of the configurations of the session matching portion 142d and packet filtering portion 142c.

When the filtering is completed as described above, the SAP application protocol identification portion 142b identifies a kind of SAP application protocol of a packet to be uploaded (S707), information of identified SAP application protocol is added (S709) and transmitted together with information of a corresponding packet to the channel management unit 230 of the host board 200.

The channel management unit 230 transmits packet information including first identification information, that is, information on the rectification of the SAP application protocol of the uploaded packet to the software engine 210 through a DMA channel of a host corresponding to the identified SAP application protocol information (S711).

In detail, the channel management unit 230 checks protocol identification information of the packet received through the PCI-e matching portion 142a and distributes the corresponding packet to a DMA channel for each instance according to instance configuration information of the software engine 210 that is an SAP application data processing engine set by the manager using the management unit 220. Actually, the packet is written in a memory region having an FIFO stack structure allocated to each DMA channel.

The software engine 210 receives the packet (S713), extracts a data payload from the corresponding packet (S715), extracts SAP application data (S717), and stores the extracted data in the log DB, that is, the SAP application load DB 240 (S719).

In this case, as described above, the software engine 210 may be formed as a multi-instance structure including a plurality of instances and may perform distributed-processing based on a session or may perform distributed-processing while classifying instances for each application protocol.

That is, as described above with reference to FIGS. 4 and 5, when two or more software engine instances are executed and there are present repetitions of a SAP application protocol data processor such as a DIAG processor, RFC processor, and HTTP processor activated for each instance, a packet corresponding to repetitive application protocol is automatically distributed based on a session. The session-based distributed processing is to provide consistency of processing packets for each SAP application protocol session for each software engine instance. In other words, packets transmitted and received between a corresponding SAP client and server with respect to the same session are always transmitted to the same software engine instance.

In conclusion, the network-based high performance SAP monitoring system has a structure of identifying all three type of SAP application protocol in a single system, thereby reducing CPU and memory resources used for software-based packet processing on a host through a hardware engine for processing packets.

Also, since the system is configured as a software engine having a multi-instance structure of each processing data of packets for each identified SAP application protocol, it is possible to identify and monitor all three types of SAP application protocol-based data transmitted and received between an SAP client and server. In addition, it is possible to process using a single system in an environment, in which massive network traffics less than 4 Gbps are inputted.

Through this, when companies and institutes operating an SAP application server using all three types of SAP application protocol will operate an SAP monitoring system, physical system resource investment and administration costs may be notably reduced.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A network-based high performance SAP monitoring system comprising:

a hardware engine selecting a packet to be updated from input packets by performing session-based filtering and pattern matching on the input packets, identifying to which application protocol belongs among dynamic information and action gateway (DIAG) protocol, remote function call (RFC) protocol, and hypertext transfer protocol (HTTP) protocol, and adding identification information of the identified application protocol to the packet to be uploaded;

wherein the hardware engine comprises a multicore processor (MCP) logic unit;

wherein the MCP logic unit comprises a session matching portion, a packet filtering portion, and an SAP application protocol identification portion, wherein the session matching portion generates a hash value by extracting 4-tuple information of the input packet, compares the generated hash value with a hash value list of a valid SAP application protocol session previously identified, when being matched, transmits a session hash value matched with the corresponding packet to the SAP application protocol identification portion, and when being not matched, transmits the corresponding packet to the packet filtering portion, wherein the packet filtering portion, in accordance with 5-tuple-based packet filtering regulations, determines whether the packet received from the session matching portion is a target of filtering, filters out a packet that is the target of filtering, and transmits a packet that is not the target of filtering to the SAP application protocol identification portion, and wherein the SAP application protocol identification portion, when the packet received from the packet filtering portion is matched with at least one of the three types of SAP application protocol through pattern matching based on a signature for identifying SAP application protocol packets, stores a session hash value and identified protocol information of the corresponding packet, adds identified protocol information to the corresponding packet, and transmits the packet added with the identified protocol information to the software engine, in which the packet received through the session matching portion is added with identified protocol information referring to the hash value transmitted together and transmitted to the software engine; and a software engine comprising a DIAG processor processing the DIAG protocol, an RFC processor processing the RFC protocol, and an HTTP processor processing the HTTP protocol, when receiving the packet added with the identification information from the hardware engine, referring SAP application protocol identification information, extracting data transmitted and received between servers of an SAP client and one of the DIAG processor, RFC processor, and HTTP processor, thereby sorting and processing the three types of SAP application protocol such as the DIAG protocol, RFC protocol, and HTTP protocol.

2. The system of claim 1, further comprising a management unit providing a user interface for SAP monitoring, updating firmware and signature of the hardware engine, managing instances of the software engine, and setting up options for SAP application protocol processing for each instance.

3. The system of claim 2, further comprising a channel management unit of a kernel level, generating and managing a channel for transmitting and receiving a policy, signature, command, and data among the management unit, software engine, and hardware engine and a direct memory access (DMA) channel for transmitting an SAP application data packet from the hardware engine to the instance of the software engine.

4. The system of claim 3, wherein the software engine has a multi-instance structure comprising a plurality of instances comprising the DIAG processor, RFC processor, and HTTP processor, respectively, and wherein the software engine is configured to process the three types of application protocol using one or more of the plurality of instances through setting up of the management unit.

5. The system of claim 4, wherein the management unit distributed-processes the SAP application protocol by controlling each of the plurality of instances to selectively process the SAP application protocol.

6. The system of claim 1, further comprising a peripheral component interconnect express (PCI-e) matching portion transmitting the packet added with the SAP application protocol identification information, received from the SAP application protocol identification portion, to the software engine through a PCI-e bus.

* * * * *